INVENTORS:
PAUL PAPENDICK
HENRY CURLEY

INVENTORS:
PAUL PAPENDICK
HENRY CURLEY

INVENTORS:
PAUL PAPENDICK
HENRY CURLEY

United States Patent Office 3,464,541
Patented Sept. 2, 1969

3,464,541
PACKAGE UTILIZING SHEET SEPARATORS IN PACKAGING ARTICLES WITH FOAMED RESIN WITHIN A CORRUGATED BOX
Paul Papendick, Flushing, N.Y., and Henry Curley, Hackensack, N.J., assignors to Diamond Shamrock Corporation, Newark, N.J., a corporation of Delaware
Filed Apr. 2, 1968, Ser. No. 718,109
Int. Cl. B65d *85/30, 5/56*
U.S. Cl. 206—46                                   13 Claims

ABSTRACT OF THE DISCLOSURE

A package utilizing sheet separators in packaging articles with foamed resin within a corrugated box thus forming an inner and outer container. Packaging material is placed in between the sealed inner and outer containers and access is obtainable to the inner container where the fragile article is stored by merely opening the outer container.

DESCRIPTION OF THE PRIOR ART

There are many classes of objects and materials that require special packing and protection in order for them to be shipped or stored or kept on hand and available for extended periods of time without actually being used. Examples of such items are delicate scientific instruments, lamps, fragile laboratory glassware, electrical tubes, components for electronic systems having delicate glass envelopes, and many other items.

In the past, many different approaches were used to try to obtain a cheap, reliable, and efficient means for packaging delicate instruments. All of these attempts, however, were not completely successful because of several factors.

The most promising approach from the efficiency of packaging standpoint was the use of foaming resins such as polyurethane as a cushioning medium for the articles to be packaged. However, the cost of packaging limited quantities of these fragile articles was often excessive since molds were often necessary in order to properly fabricate packages from these resins, and the cost for such molds or jigs was so great as to require a large production run in order to reduce the cost per unit packaged.

Efforts were made to justify the relatively high per unit cost for the polyurethane packaging material by attempting to produce reuseable packages of a semi-permanent nature. However, since it was necessary for the article packaged to be completely surrounded by the cushioning material, the semi-permanent packages had to be constructed with very large removable sections in order to obtain access to the packaged article. This type of construction produced a very large mating surface in the package which usually ran through the entire length of the package dividing it into two halves. As as consequence, these packages, once used, usually proved to be fairly weak because they were susceptible to shear forces along the extensive mating surface.

Other approaches to the problem of a cheap efficient packaging method were made along more conventional line. For example, efforts were made to use vermiculite and excelsior as packaging mediums. However, these frangible and dirty materials presented multiple problems which could not be overcome for purposes of a reuseable package and often for the purposes of a single use package. The primary problem presented by these materials is the dirt caused by their use and the possible contamination of any article whose performance is affected by the presence of any foreign bodies or dirt on its surface or in its internal workings. These materials are consistently scattered over a large area every time the package in which they were used was opened.

SUMMARY OF THE INVENTION

To overcome these difficulties, applicant has provided a package construction having a flexible inner container disposed within an outer container, with the packaging material disposed between the inner and outer containers. The placing of the packaging material between the containers molds the inner container about the article packaged to provide maximum protection. The inner and outer containers are connected by a common access passage which allows the package item to be removed without disturbing the packaging material.

Accordingly, it is an object of this invention to provide a package for fragile articles which will provide maximum protection against vibrational shock, thermal conditions, impact, inverting, tipping or other potentially damaging treatment.

Another object of this invention is to provide a package which can use a wide variety of packaging materials without affecting the reuseabilty of the package.

Still another object of this invention is to provide a package which can utilize foaming resins as a cushioning material without requiring molds or dies for the forming of the cushioning material.

Another object of this invention is to provide a package which can utilize foaming resinous materials such as polyurethane and which does not require jigs or holding fixtures to position the fragile article within the package during the foaming process.

Another object of the invention is to provide a package for a fragile material which can be opened without coming into contact with the packaging material.

Another object of the invention is to provide a package for fragile articles which can be opened and resealed without reducing the strength of the resealed package below that of the unopened package.

Another object of the invention is to provide a package which can use frangible or other generally messy types of packaging materials without any danger of the packaging material contaminating the article being packaged.

Another object of the invention is to provide for a package which can be reused and which does not have a large and relatively weak mating line extending around the periphery of the package.

Other objects and features of the invention will become apparent from the following detailed description of several typical forms of packaging or packing and methods of providing the same according to this invention, throughout which description reference will be made to the accompanying drawings.

For the purpose of illustrating the invention there are shown in the drawings forms which are presently preferred; it being understood, however, that this invention is not limited to the precise arrangements and instrumentalities shown.

DESCRIPTION OF THE PREFERRED EMBODIMENTS

Figure 2:
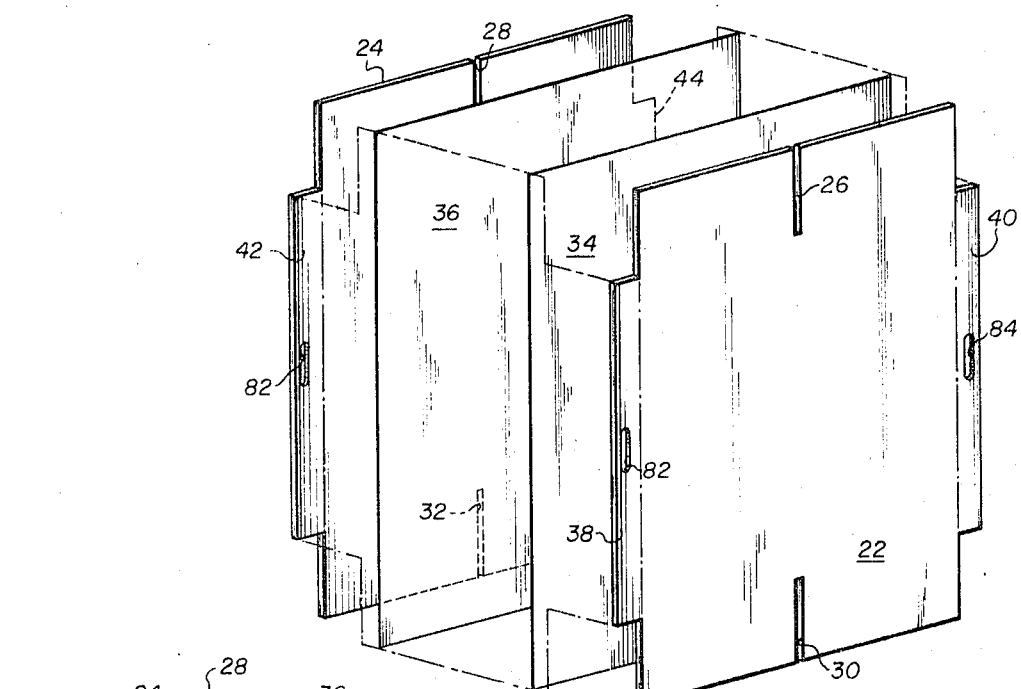
FIGURE 2 is an exploded view of the components used to fabricate the package shown in FIGURE 1.
Figure 1:
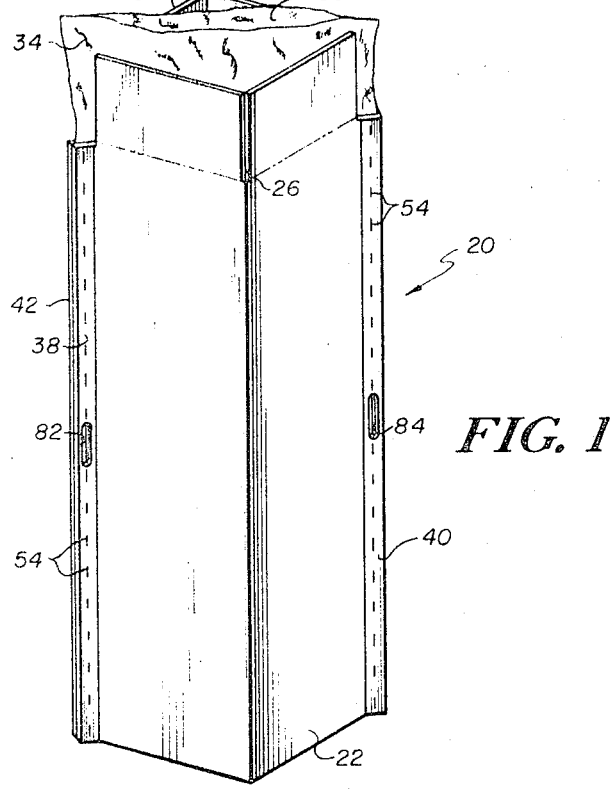
FIGURE 1 is a side elevation of a package constructed in accordance with the invention opened prior to receiving the article to be packaged and the implantation of the packaging material.

FIGURES 1 and 2 show a package generally at 20 formed from four pieces of material. The outer walls of the package 20 are made from two sheets of material 22 and 24 which can be fabricated from any convenient material such as cardboard, very heavy duty paper, or any other material which is capable of being bent and shaped.

Upper grooves 26 and 28 on sheets 22 and 24 respectively and lower grooves 30 and 32 on sheets 22 and 24 respectively are positioned in the sheets to facilitate the forming of the outer container as will be more fully explained hereinafter.

Two thin sheets of flexible material 34 and 36 are disposed between the outer walls 22 and 24. These sheets will be joined at their edges and at their bottom to form a flexible inner container which will house the fragile articles stored within the package.

Extensions 38 and 40 on outer sheet 22 and extensions 42 and 44 on outer sheet 24 form flanges which, when the sheets 22, 34, 36 and 24 are laid one upon the other provide a flanged surface for sealing all of the sheets together as for example by means of staples or any other convenient fastening device.

Once all four sheets are securely fastened together the outer wall sheets 22 and 24 can be bent along the line connecting the upper and lower grooves in each sheet, for example grooves 26 and 30 in sheet 22, so as to bring the package into a generally rectangular cross-sectional shape.

The flaps on the botom of the outer sheets can then be folded under and fastened by any convenient method to form a bottom for the package. Either before or after this bottom is formed, depending upon the needs of desires of the person using the package, the bottom of flexible sheets 34 and 36 can also be sealed.

The package is now in condition to receive the article to be stored therein and for the placing of the packaging material between the inner and the outer containers.

Figure 3:
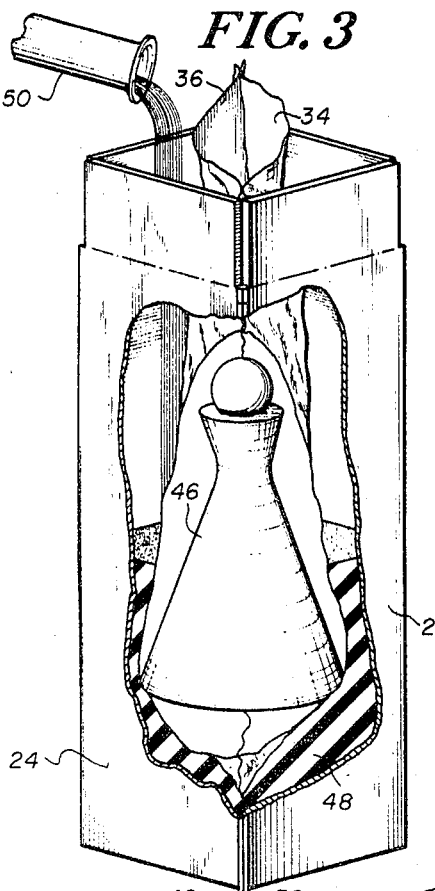
FIGURE 3 shows a side view partially in section of a package similar to that shown in FIGURE 1 being filled with a resinous foaming packaging material.

As shown in FIGURE 3, a representative delicate object 46 such as a lamp has been placed between the sheets 34 and 36 forming the flexible inner container. Any of the typical foaming resinous materials used for packaging as for example those shown in U.S. Reissue Patent 24,767 and U.S. Patent 3,223,232 can be poured into the space between the inner and outer containers. As shown in FIGURE 3, the foaming resin 48 which is polyurethane is delivered from any well known delivery means 50.

In order to prevent damage to heat sensitive materials which may be stored in these type of packages, the outer surface of the flexible sheets 34 and 36 can be coated with a heat reflecting material such as aluminum to minimize any transfer of heat produced by the exothermic chemical reaction occuring during the foaming of the resin. The flexible sheets 34 and 36 could be made of polyethylene, polypropylene or untreated paper.

It should be noted that the foaming resin does not have to be poured into the container in two separate charges if this is particularly undesirable for the person forming the package. It is possible to seal the bottom portion of the inner flexible container above the bottom formed by the flaps as previously described. The foaming resin poured in one space between the inner and outer containers of the package will flow underneath the inner container and fill the other side of the container as well.

It should also be noted that it is not necessary to precisely fix the location of the item being stored in the package. The fragile item can be roughly located within a wide range of locations in the package and still get maximum benefit from the cushioning of the packaging material. Additionally, if positioning is necessary this can be very easily done by merely reaching into the top of the flexible bag to position the fragile item or if necessary holding the fragile item within the flexible bag while the foaming resin is being poured.

Figure 4:
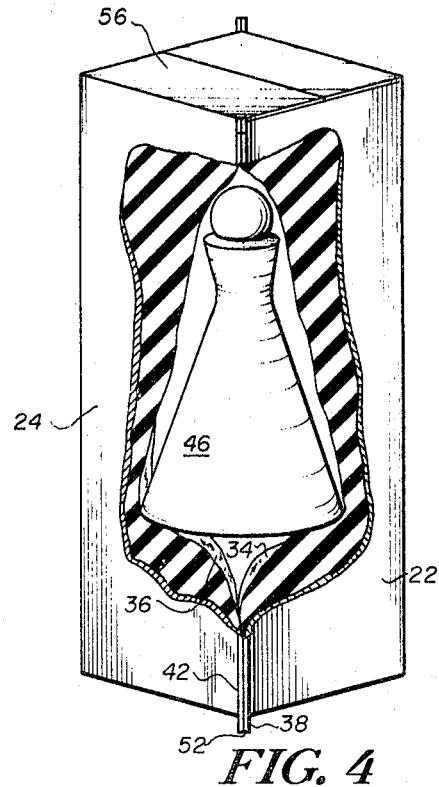
FIGURE 4 shows the package of FIGURE 3 after all of the packaging material has been added and the foaming process has been completed.

As seen in FIGURE 4, after the proper quantity of foaming resin has been poured into the space between the inner and outer container the top flaps of the container can be sealed to completely close the container. During the foaming process the expanding foam will mold the inner container about the fragile item thereby forming an intimately shaped envelope about the fragile item which will hold the item immobile and prevent loose and random movement of the item within the package during shipment or movement of the package.

Note also in FIGURE 4 that there is no continuous parting line in the finished package. As mentioned earlier, extensions 38 and 42 on sheets 22 and 24 respectively serve as flanges for the sealing of all four sheets together. Each of these sealing flanges produces an access line directly from the outer surface of the outer container to the inner surface of the inner container. For example in FIGURE 4, the access line 52 is formed by sealing flange 38, flexible sheets 34 and 36 and sealing flange 42. As can be seen from FIGURE 5, if this acess line is opened easy access is available to the delicate object 46, since removal of the staples 54 holding access line 52 together opens up not only the seal between outer sheets 22 and 24 but also the seal between inner flexible sheets 34 and 36. However, the inner sheets 34 and 36 remain sealed to outer sheets 22 and 24 by reason of glue 39 and 41 or other adhesive on its flanges 38 and 42 as best shown in FIGURE 6. The glue is optional and would be most desirable if the packaging material were vermiculite or excelsior.

Figure 5:
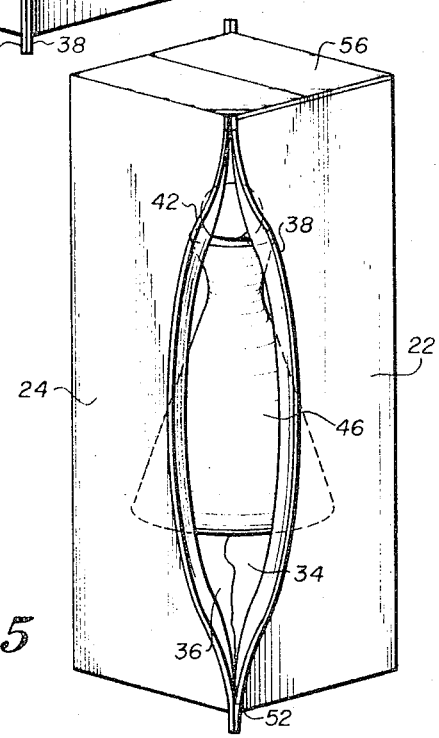
FIGURE 5 shows a side view of a package built in accordance with the present invention being opened for removal of the item stored inside.
Figure 6:
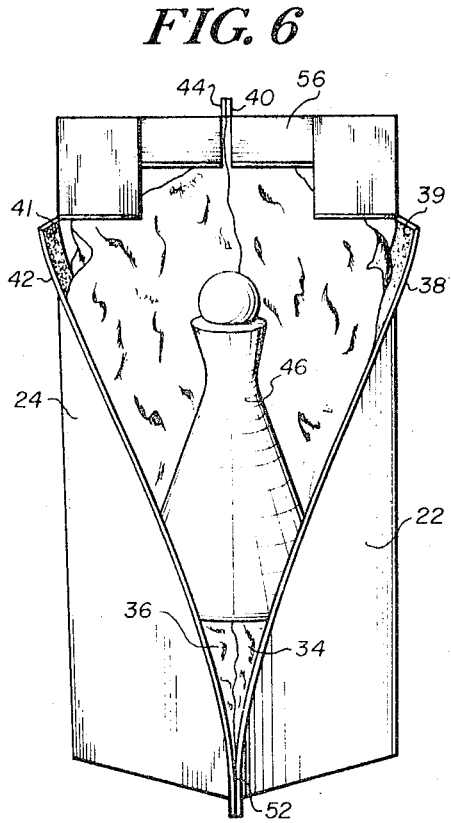
FIGURE 6 shows a broken away view of the construction of a package built in accordance with the present invention.

It should be noted from FIGURES 4 and 5 that access line 52 does not continue all the way around the package. When it reaches the top of the package the access lines ends. In order to obtain any sort of entry to the top of the package you must go to the mating line 56 formed by the junction of the top flaps which close the top of the package. This type of construction therefore is extremely strong since there is no single shear line along which the package can be ruptured.

As can be seen from FIGURE 5 and FIGURE 6 access to the delicate instrument within the flexible container is extremely simple. All that is necessary is to remove the staples 54 or any other fastening means that is used to fix extensions 38 and 42 and 40 to 44. It is then quite easy to merely open the side of the package and obtain free access to anything stored within. Similarly, the converse can be accomplished with minor effort. To close the package or reseal it for future use all that is necessary is to replace the item originally stored with the inner container and restaple the access line formed by flanges 38 and 42 and 40 and 44. Note that the top seam 56 and the corresponding bottom seam on the package need not be disturbed. Also it should be pointed out that since access has been achieved directly to the storage area within the inner container there is no need to in any way disturb the packaging material disposed between the inner and outer containers.

Figure 7:
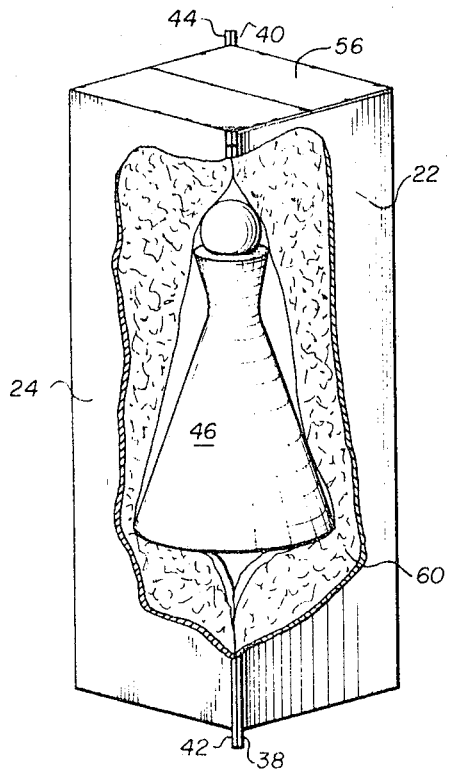
FIGURE 7 shows a side view in partial section of a package built in accordance with the present invention using a different type of packaging material from that shown in the previous figures.

Since the packaging material is not in communication with access opening, it is possible to use a wide variety of packaging materials which would not mainly be used for many applications. As shown in FIGURE 7 a frangible packaging material, such as vermiculite, an excelsior, or any other type of fragmentary packaging material designated generally as 60 can be used in this package construction. The item to be stored can be placed in the inner container as was previously described and all access lines and the bottom section sealed. The frangible or segmentary packaging material can then be packed around the item to be stored in the space between the inner and outer containers.

Figure 8:
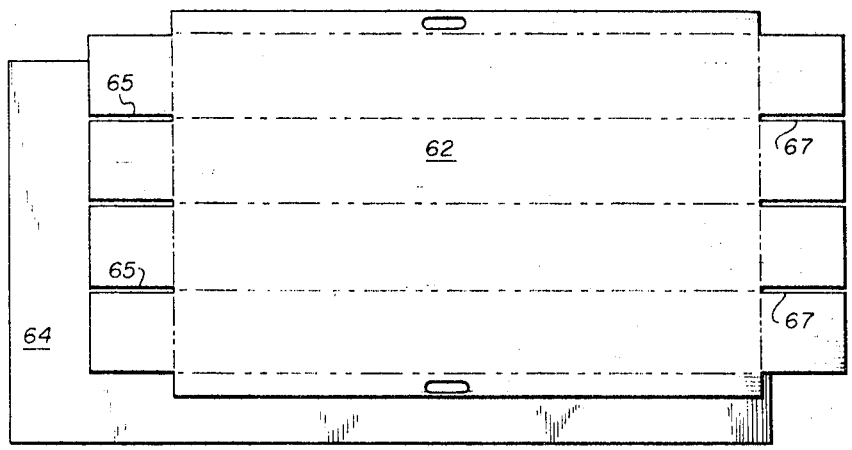
FIGURE 8 shows an exploded view of the components for another embodiment of the present invention.

In all of the previous embodiments of the invention described two sheets were used to form the inner and the outer containers. Of course this need not be the only form of construction. As shown in FIGURE 8, the entire package can be made from one outer sheet 62 and a single inner sheet 64. The only change of significance would be that additional grooves 65 and 67 would have to be cut in the upper and lower portions of the outer sheet to form the flaps for the top and the bottom of the finished package.

Figure 9:
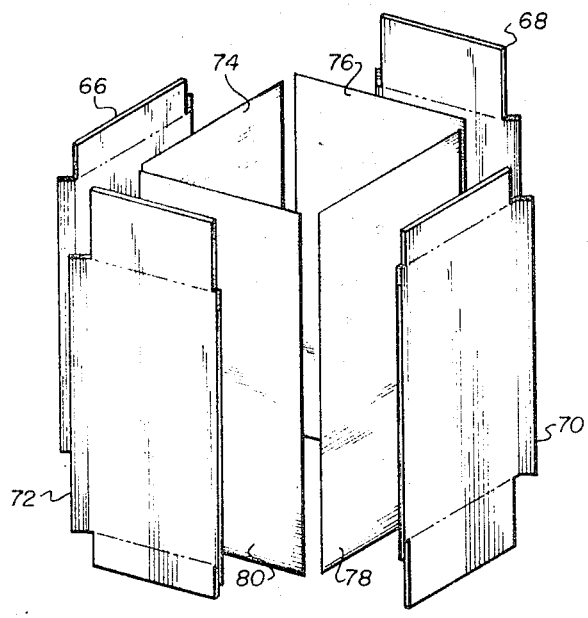
FIGURE 9 shows an exploded view of yet another embodiment of a package built in accordance with the present invention.

FIGURE 9 shows that several different methods of construction for this package are possible. In FIGURE 9 instead of using a single outer and inner sheet or two outer sheets and two inner sheets, four outer sheets 66, 68, 70 and 72 and four inner sheets 74, 76, 78, and 80 can be used in exactly the same manner as the two sheets were used in FIGURES 1 through 5.

Another advantage can easily be built into this invention in that the sealed flanges formed by extensions 38 and 42 and 40 and 44 of FIGURES 1 and 2 can easily be adopted to make handles for carrying the package. As shown in FIGURES 1 and 2 the sealing flange formed by flanges 38 and 42 has a handle 82 cut into the middle of the flanges to form a handy grip for carrying the package. Similarly a handle 84 is formed in the other sealing flange formed by flanges 44 and 40 respectively.

We claim as our invention:

1. A package for packaging damageable material comprising:
    (a) closed outer container formed with at least one bendable external access line;
    (b) a generally flexible walled, closed inner container having at least one access line for housing the damageable material, said inner container having at least a portion of said one access line coinciding with said access line for said outer container,
    (c) the area adjacent the coinciding access line of the inner container joined to the area proximate the access line of the outer container so that the opening and sealing of even only a portion of said bendable access line of the outer container will control the opening and sealing of the proximate portion of said inner container access line;
    (d) packaging material disposed between said outer container and said flexible inner container to cause said inner container to mold itself about, support and protect said damageable article;
    (e) means for sealing the access line of said outer container and thereby to seal said inner container.

2. The combination claimed in claim 1 wherein said outer container is formed from a single sheet of material constructed to be folded and sealed to form a closed outer container having a single access line.

3. The combination claimed in claim 1 wherein said outer container is fabricated from cardboard sheet.

4. The combination claimed in claim 1 wherein said packaging material comprises a cellular plastic material.

5. The combination claimed in claim 1 wherein said packaging material comprises a foaming resinous material such as foamed polyurethane.

6. The combination claimed in claim 1 wherein said packaging material comprises vermiculite.

7. The combination claimed in claim 1 wherein said packaging material comprises excelsior.

8. The combination claimed in claim 1 wherein said outer container comprises a plurality of sheets of material constructed to be shaped and sealed to form a closed container having a plurality of access lines;
    (a) said inner container comprises a plurality of sheets of flexible material corresponding in number to the number of sheets in said outer container constructed to be shaped and sealed to form a closed container having a plurality of access lines; and
    (b) all of said outer container access lines coinciding with all of said inner container access lines.

9. The combination claimed in claim 8 wherein
    (a) each sheet forming the outer container is generally rectangular in shape;
    (b) the top and bottom of said outer container is formed by folding the top and bottom of each sheet to coact with folded portions of other outer sheets;
    (c) said inner and outer containers constructed so that the bottom and all access lines of said inner and outer containers can be sealed while the top of said inner and outer containers may remain open and be separately sealed, whereby the damageable article may be placed in the inner container, the container sealed, then the packaging material placed between the inner and the outer containers and then the top of the outer container sealed.

10. The combination claimed in claim 8 wherein said means for sealing the access lines of said outer container comprise;
    (a) an extension along the joining ends of each of said sheets;
    (b) said extension folded to form a protruding sealing flange;
    (c) one of said sealing flanges cooperating with the sealing flange on an adjacent sheet to form the access line;
    (d) staple means sealing the two sealing flanges.

11. The combination claimed in claim 10 further comprising carrying means cut into said protruding sealing flanges forming said access lines.

12. The combination claimed in claim 1 wherein the inner container is fabricated from heavy duty paper.

13. The combination claimed in claim 12 wherein the heavy duty paper has a heat reflecting coating on the outer surface thereof.

References Cited

UNITED STATES PATENTS 3,250,383    5/1966    Smitter _____ 206—46

FOREIGN PATENTS 1,225,812    2/1960    France.

JOSEPH R. LECLAIR, Primary Examiner

J. M. CASKIE, Assistant Examiner

U.S. Cl. X.R.

229—14